United States Patent [19]

Hartmann

[11] 4,233,433
[45] Nov. 11, 1980

[54] PROCESS FOR PRODUCING MOLDED ARTICLES FROM POLYLAURYLLACTAM ACTIVATED ANIONIC POLYMERIZATION

[75] Inventor: Werner Hartmann, Immenstaad, Fed. Rep. of Germany

[73] Assignee: Harwe AG, Zurich, Switzerland

[21] Appl. No.: 811,057

[22] Filed: Jun. 29, 1977

Related U.S. Application Data

[63] Continuation-in-part of Ser. No. 579,620, May 21, 1975, abandoned.

[51] Int. Cl.³ .............................................. C08G 69/18
[52] U.S. Cl. ................................ 528/326; 526/64; 526/65; 526/67; 528/312; 528/315
[58] Field of Search ................ 528/326, 312; 526/64, 526/65, 67

[56] References Cited

U.S. PATENT DOCUMENTS

| | | | |
|---|---|---|---|
| 3,015,652 | 1/1962 | Schnell et al. | 260/78 L |
| 3,121,768 | 2/1964 | Boyer | 260/78 L |
| 3,216,976 | 11/1965 | Schwartz et al. | 260/78 L |
| 3,451,975 | 6/1969 | Gaspar et al. | 260/78 L |
| 3,488,326 | 1/1970 | Van Beveren et al. | 260/78 L |
| 3,525,719 | 8/1970 | Schwarz | 260/78 L |
| 3,793,255 | 2/1974 | Handtmann | 260/78 L |
| 3,799,912 | 3/1974 | Hebert | 260/78 L |
| 3,823,105 | 7/1974 | Morival et al. | 260/78 L |
| 3,883,608 | 5/1975 | Hebert | 260/78 L |
| 3,917,549 | 11/1975 | Morival et al. | 260/78 L |

FOREIGN PATENT DOCUMENTS 2108759  9/1972  Fed. Rep. of Germany.
2507549 12/1975  Fed. Rep. of Germany.
479654  10/1969  Switzerland.

*Primary Examiner*—Harold D. Anderson
*Attorney, Agent, or Firm*—Christie, Parker & Hale

[57] ABSTRACT

Molded articles of polymerized lactams are prepared by pumping of a catalyst containing partial lactam melt at a temperature of ± 1° C. of a temperature in the range of 160° C. to 170° C. and a lower temperature activator containing partial lactam melt at a temperature of ± 1° C. of a temperature in the range of 160° C. to 170° C. to which activator addition is delayed relative to catalyst addition, with separate gear pumps to a mixing zone maintained between 170 and 175° C., the pumps connected to the mixing zone by straight feed tubes positioned at an angle of inclination to the horizontal of a maximum of 10°, each feed tube having a volume of at least one-third greater than the pump to which it is connected and form the mixing zone into a mold. At least part of the gases released are returned to the mixing zone by the tube systems and gear pumps. Apparatus to carry out the method is also provided.

6 Claims, 1 Drawing Figure

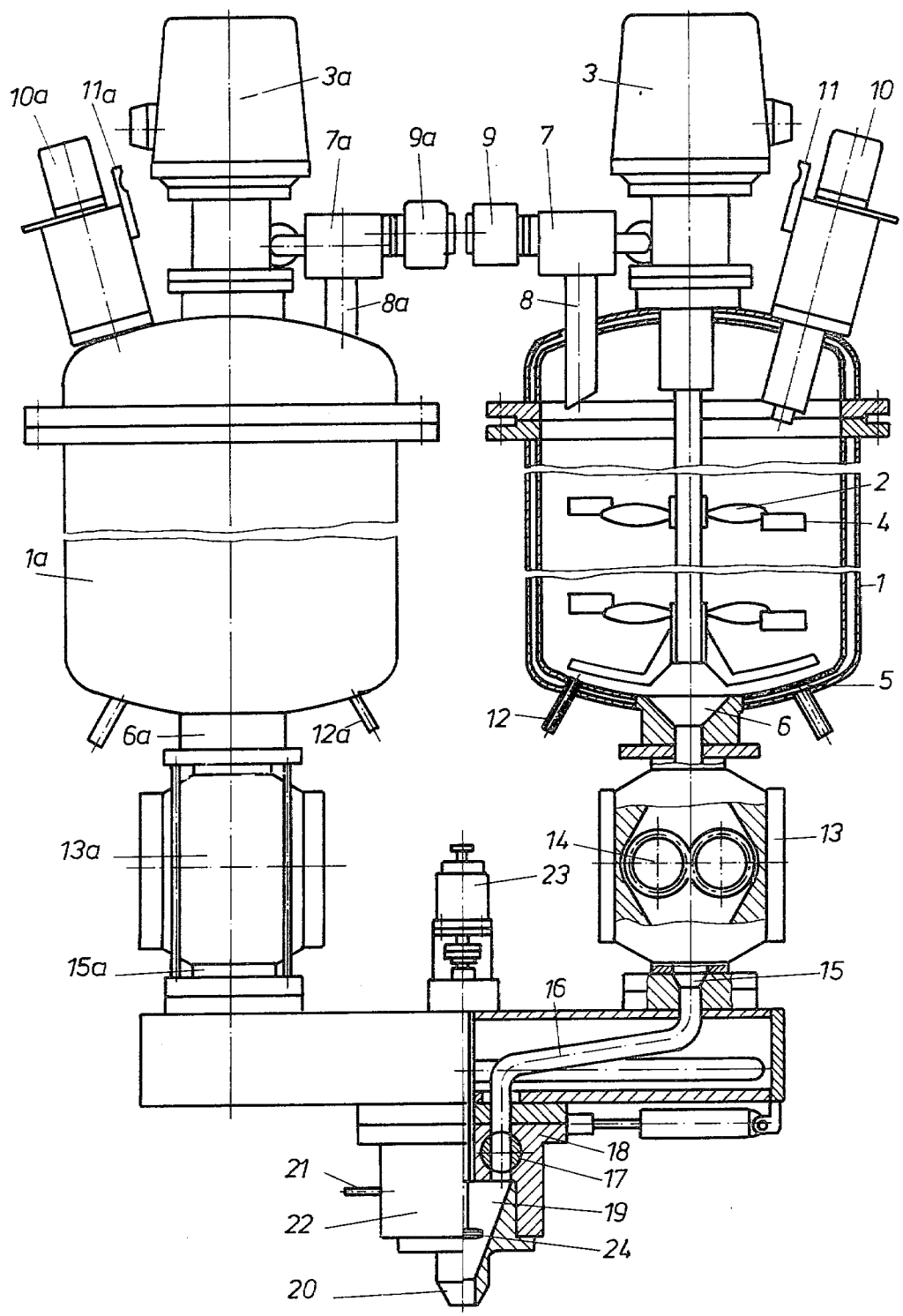

PROCESS FOR PRODUCING MOLDED ARTICLES FROM POLYLAURYLLACTAM ACTIVATED ANIONIC POLYMERIZATION

CROSS REFERENCE TO RELATED APPLICATION

This application is a continuation-in-part of my application Ser. No. 579,620 filed May 21, 1975, now abandoned.

BACKGROUND OF THE INVENTION

The invention relates to a process for producing molded articles from polylactams by activated anionic polymerization of medium lactams. By the term "medium lactams" used herein, lactams having from 12 to 15 C-atoms in the lactam ring are referred to, i.e. the lactam of n-tridecane myristin and n-pentadecanoic acid as well as that of the lauric acid, which is particularly preferred.

It is known that in the polymerization of lactams, the monomer lactam is melted and the melt is mixed with at least one catalyst and at least one activator, whereupon the polymerization reaction takes place, for which it is already known, too, from Swiss Pat. No. 479 654 and German laid-open application No. 2 108 759, to carry out the polymerization in a manner such, that a partial quantity of the lactam melt is actively mixed with the catalyst and the other partial quantity with the activator.

From U.S. Pat. No. 3,793,,255 in addition a process for producing molded articles by the activated anionic polymerization of lauric-lactam is known, wherein two lactam melts are separately actively mixed with a catalyst and an activator, with nitrogen acting on each melt and are fed to the mixing device via separate tube systems being under the same temperature action as the melts, and, thereupon, flow into a mold, with the thus treated partial melts being urged to pass through one siphon-like spiral tube system each on their way to the mixing device. By this process qualities of the polymerization product (polymer) are obtained which are completely different from those of the common polycaprolactam.

The drawback (disadvantage) of this process, however, resides in the fact, that in the beginning (of the process) polymerized molded products of excellent qualities may be obtained, that, however, these qualities are very much deteriorated already upon a short interval of time, and that finally, in numerous cases, products with insufficient qualities are obtained.

A modification of this process for producing molded articles from polylactams is suggested in German laid-open application No. 25 07 549. By this process, for instance, a polylaurin-lactam is obtained from lauric-lactam, having the following properties completely different from those of the known polycaprolactams:

a yield sress $\sigma_S$ of about 470 to about 520 kp/cm$^2$, measured according to DIN standards 53 455;

a tension at yield stress $\epsilon_S$ of about 17 to about 25% measured according to DIN 53 455;

a tensile strength $\sigma_R$ of about 500 to about 630 kp/cm$^2$, measured according to ISO R 527;

a breaking tension $\epsilon_R$ of about 200 to 350% measured according to ISO R 527;

a modulus of elasticity E of about 19 000 to about 22 000 kp/cm$^2$ measured according to DIN 53 457 para 2.3, a critical bending stress $\sigma_B$ of about 750 to about 1000 kp/cm$^2$ measured according to ISO R 178;

a notch impact strength $a_k$ of about 55 to 65 kpcm/cm$^2$ measured according to DIN 53 453;

a ball pressure hardness of 10" of about 1000 to about 1050 kp/cm$^2$, measured according to DIN 53 456 step C;

an abrasive resistance of about 158 to about 129 mm$^3$/rpm measured by means of Taber-Abraser;

a time yield stress $\sigma_1/1000$ (23° C./95%) of about 50 to about 60 kp/cm$^2$ measured according to DIN 53 444;

a modulus of creeping $E_c/1000$ ($\sigma$20,0) of about 13 000 to about 14 000 kp/cm$^2$ measured according to DIN 53 444.

However, this process, too, is not free of a deterioration encountered in the course of a longer pot time, with by "pot time" the interval of time being referred to, during which the partial melt containing the catalyst and the partial melt containing the activator are kept separated from each other prior to the mixing and molding (casting).

The reason for this unsatisfactory behaviour, on the one hand, and the rather quick failure in obtaining optimum qualities of the products in the course of the operation time, is not readily evident. Yet, in the scope of the extensive tests carried out in regard of the present invention, it was found, that, on the one hand, the lactam melt, containing the catalyst, is more viscous than the lactam melt containing the activator, so that thereby already a non-uniform outflow of the separated melts from their vessels and a non-uniform supply to the mixing area are effected. Attempts to obtain a more uniform viscosity of the two partial melts by raising or lowering, respectively, the temperatures of the individual melts failed, too, since thereby the most favorable temperature required for a uniform injection molding was modified and, accordingly, inferior products were obtained. In these tests, it was additionally found, that with respect to the two partial melts and the temperature at the injection nozzle or mouth piece very special temperature conditions have to be met, in order to obtain acceptable results at all. Even when duly taking into account the two aforementioned aspects, it was found, however, that this was not yet sufficient, in order to obtain a satisfactory product, but that for this purpose, it is additionally required that part of the gases which develop or are encountered in the mixing zone and in the partial polymerization taking place therein, have to be removed from the mixing zone and returned to the vessels.

One problem of the invention, therefore, resides in providing a process for producing molded articles from polylactams, for which properties different from the known polycaprolactam may be obtained throughout the operation period and wherein the above-identified disadvantages are not encountered.

It is a further problem of the present invention to provide an apparatus suitable for carrying out such process.

SUMMARY OF THE INVENTION

The present invention provides improvements to an injection molding or casting process for producing molded articles of polylauric lactams by activated anionic polymerization of monomeric lactams, wherein a catalyst and an activator are separately added to a first and a second lactam melt, while both melts are protected by an inert gas such as nitrogen, and where the melts are fed to a mixing zone by separate conveyor tube systems sustained at substantially the same temperature as a melt, and injected from the mixing zone into a mold for the article. The improvement comprises first adding with agitation to the first lactam melt contained in a first vessel at least one polymerization catalyst for the lactam while maintaining the mixture of the lactam melt and added catalyst under stirring at a first temperature which is below about 170° C. and above about 160° C. at a temperature tolerance of about ±1° C. of said first temperature. Following the addition of the catalyst to the first lactam melt, at least one activator for the polymerization is added to the second lactam melt under agitation while maintaining the formed mixture of the second lactam melt and added activator under stirring at a second temperature which is lower than the temperature of the first melt and within a temperature range of below about 170° C., and above about 160° C. at a temperature tolerance of about ±1° C. of the second temperature. The first and second melts are pumped at the melt temperatures by respective first and second gear pumps to a mixing zone through respective first and second essentially straight conveyor tube systems having an angle incline to the horizontal plane of a maximum of about 10°, each tube having a volume at least one-third greater than the volume capacity of the pump. The melts are combined in a mixing zone at a temperature between about 170° and about 175° C. where the polymerization reaction is initiated, and while still molten injected into a mold for shaping of the article in which polymerization to an end product is carried out. Gases released in the mold are at least in part returned to at least one of the mixing vessels by the conveyor tube systems.

The apparatus for forming of polylactam articles comprises two mixing vessels each including means to maintain the contents of the vessels at a seclected temperature and means to agitate the contents of the vessels. A filling tube extends into the vessel at the upper end thereof and is closable by a three way tap cooperating with a two way valve. Means for feeding an activator or catalyst respectively into the vessel is also provided. An outlet at the base of each vessel is connected to a gear pump which, in turn, is connected to conveyor tubes leading at an incline from each gear pump to a common mixing chamber coupled to an injection molding outlet. Each conveyor tube is inclined with respect to the horizontal to a maximum angle of about 10° and dimensioned to have a volume at least one-third greater than volumetric pumping capacity of the gear pump to which it is connected. The apparatus includes means to maintain the mixing zone at an elevated temperature.

THE DRAWING

The attached drawing illustrates a particularly preferable design of apparatus used in the invention in sectional view.

DETAILED DESCRIPTION

In the following, the invention is explained in more detail with the aid of the Drawing. As example for the description, the production of molded articles from polylaurin-lactam was selected, though according to the invention the further medium lactams, too, may be employed, with for this purpose only slightly modified temperature ranges being required which may be readily found by the expert by carrying out simple tests. In the Drawing only the fundamentally substantial parts are described, while it is a matter of course that control elements, switching levers, thermometers and pressure measuring devices, supply lines and discharge lines are additionally provided.

In the diagrammatic representative of the Drawing, two heating vessels 1 and 1a are shown, which are on principal, identical and which are provided in the usual manner with agitator blades 2 driven by agitators 3 and 3a and with baffle discs 4. The jacket of the vessel is equipped with heating means which are adjustable within narrow temperature ranges, with as heating means electric heaters, hot vapor or hot oil and the like being suitable for use in a completely usual manner. The heating means is schematically defined by 5. At the bottom end the vessels are provided with sealable outflows 6 and 6a, while at the top end, each, one three-way tap 7 having a filling tube 8 projecting into the vessel and one two-way valve 9 being provided. In addition, at the upper part of each vessel a bomb 10 or 10a, respectively, with releasing levers 11, 11a are provided, said levers serving for releasing the catalyst into vessel 1 or the activator into vessel 1a, respectively. Furthermore, a thermostat 12 is inserted in the wall of the vessel which has an accuracy of response of maximum 1.5° C.

Vertically below the outlets 6 or 6a, respectively, of the heating vessels, two gear pumps 13 and 13a with oppositely directed gears 14 and with a lower outflow 15 or 15a, respectively, are provided. The gears have a considerable size and move rather slowly in order to avoid any strong turbulence in the passing melt. By the adjustment of the pump the outflowing quantities of the melts from the melting vessels 1 and 1a may be controlled precisely.

From the pump outflow 15 and 15a, a substantially straight conveyor tube 16 leads to the inlet head sealable by means of a seal 17 of the mixing zone 19. In the scope of this invention, it is extremely important that this conveyor tube 16 is substantially straight and has only a slight inclination with respect to the horizontal plane in the order of maximum 10°; preferably 5°. Very substantial for the invention is also the dimensioning of the volume of this tube 16. It has to be dimensioned to a volume that is at least one-third greater, preferably twice as large as the volumetric conveying capacity of the gear pumps 13 and 13a. This means, that during the operation this conveyor tube may be filled by the outflowing melts approximately to one half, but that in no event more than two-thirds of this tube may be filled by the melt. Of course, this conveyor tube, too, is heat insulated. The funnel shaped mixing zone 19 into which discharge the melts containing the catalyst or the activator, respectively, which are fed from the melting vessels 1 and 1a via the conveyor tube 16 or the conveyor tube 13a from the group, serves for the smooth mixing of the two melts with any strong flow or turbulence having to be thoroughly avoided. The mixing zone ends in a sealable casting mouth or nozzle piece 20. The entire casting head, too, is maintained at a certain temperature by the aid of heating means, with a thermostat 21 having an accuracy of response of about 1° C., accounting for a very precise temperature stability. Centrically above the casting head, if desired, a weak agitator 23 with a small agitator blade 24 may be provided in the mixing zone. As a rule, however, this agitator and the actuation of the agitator blade are not required and in any case, the agitator blade should only be actuated extremely slowly, since too, vehement agitation causes an undesired flow or turbulence. On principle the agitator blade only serves the purpose of removing obstructions which might be encountered and of ensuring a smoother outflow.

In carrying out the operation under actuation of the agitator 3 equivalent quantities of the lactam melt are fed into the heating vessels 1 and 1a through the filling tubes 8 and, at the same time, nitrogen, too, for flushing the vessel is introduced through these tubes by means of the three way tap 7. During the entire process, the exclusion of air, oxygen and air humidity has to be thoroughly observed, without the measures required for this purpose having to be mentioned here, since they are part of the average knowledge of those skilled in the art. After the suitable temperature adjustment is reached in each vessel, at first from bomb 10 the required quantity of catalyst is discharged into the vessel 1 by means of lever 11 and is stirred, said quantity of catalyst generally being within the range of about 0.1 to 0.6 mole-%, preferably 0.3 to 0.4 mole-%, based on lactam. The temperature of the catalyst-containing melt is then maintained at a value below a value of 170° C. and above a value of 160° C., preferably in the range of from 169.5° to 167.5° C., and the melt is agitated for a quarter of an hour to half an hour, preferably for about 20 minutes. Also during this interval the introduction of nitrogen is advisable.

With a delay of 5 to 15 minutes, preferably of about 10 minutes calculated from the addition of the catalyst to the melting vessel 1, the activator in an amount of about 0.05 to 0.5 mole-%, preferably 0.8 to 0.15 mole-% based on the lactam is added to the partial lactam melt provided in the melting vessel 1a from bomb 10a by means of the release lever 11, and the melt containing the activator is maintained at a temperature being somewhat lower than that of the melt in vessel 1, in the range of temperature below 170° C. and above 160° C., preferably in a range of temperature from 166° to 164° C.

By this delayed addition, it is obtained that in both vessels the viscosities of the partial melts contained therein are approximately identical. The catalysts and activators used are the common ones. As examples for catalysts used in the production of polylactams, metallic sodium, sodium amide, alkali lactams, anhydrous ethanol and carbon dioxide may be used. Sodium amide is particularly preferable. As examples for activators used in the production of polylactams, isocyanates, e.g. phenyl isocyanate, substituted lactams, for instance, N-aryl lactams and N-cyano lactams, substituted ureas and reaction products of the carbamic acid chloride with heterocyclic compounds such as imidazole, may be mentioned. The particularly preferred activator is phenylisocyanate. After agitating the two partial melts for the required interval up to about 1 hour, preferably about one-half an hour in case of the melt containing the catalyst with the agitating time reduced by 5 to 15 minutes in case of the melt containing the activator, the casting into molds may be started with, which molds need not be preheated and which, too, do not require any heat dissipation and the like. For this purpose upon opening the respective seals the melt from vessel 1 enters the gear pump 13 adjusted to the additional gear pump 13a with respect to the conveying capacity, and subsequently flows into the mixing zone 19 via the inclined conveyor tube 16, which may be filled only to a maximum of two-thirds by the outflowing melt. In symmetrically identical manner the melt containing the activator, too, flows from the melting vessel 1a into this common mixing zone 19. When mixing the two partial melts the polymerization reaction is initiated and partially by decomposition of the catalyst and of the activator, partially due to the reaction and partially due to entrained gases a considerable amount of gas will be encountered. This amount of gas forms a gas cushion above the mixing zone and in the empty part of the conveyor tube, said gas cushion being extremely useful for carrying out the process. It is now of great importance for the success of the present process according to the invention that these developing gases are not retained in their entirety in the molding mass and discharged into the molds through the molding nozzle or mouth piece 20, but that at least part of these gases is returned to at least one of the mixing vessels 1 and 1a via the conveyor tubes 16 larger dimensioned for this purpose and the countercurrent gear member of the gear pumps. From these mixing vessels they are discharged through the filling tube and via the two-way valve 9 like the introduced nitrogen gas.

In addition, it was found to be very advantageous, that during the casting operation the agitators in the vessels remain inoperative, since otherwise in a manner that may not be readily explained a disintegration of the materials within the molds may be encountered. In any case, the gear pumps and the agitators may never be operated at a speed which might support the formation of foam, but rather all measures have to be taken in order to ensure a uniform continuous mixing.

It was also found to be very essential that the casting head 22 and the molding nozzle or mouth piece 20 are maintained at a temperature somewhat higher than the temperature of the arriving partial melts, i.e. at a temperature within a range of about 170° C. to 175° C., preferably 171° to 173° C.

Although not shown in the drawing it was found to be very advantageous to additionally provide heat shields on the casting head, which heat shields are heated to approximately 190° to 220° C. and which, on the one hand, heat the jet being discharged and, on the other hand protect the environment from humidity. The casting is substantially effected without pressure, although low pressure may be employed.

It is interesting, that with the present conversion neither in the reaction nor during the hardening a substantial heat change is encountered, as it is otherwise the case with polylactams and polyamides, so that no preheating of or heat dissipation from the molds is required, local overheatings are not possible even in a large cast, and products with properties so far not known in polylactams may be obtained, which, for instance, do not show a melting point, but crumbly decompose after hardening when heated to temperatures from approximately 220° to 280° C. They particularly have a high crystallinity and thereby yield quite enormous strength values, as evident from the following Table I.

TABLE I

| Item | Method | Dimension | Value | Dimension | Value |
|------|--------|-----------|-------|-----------|-------|
| Mechanical properties: | | | | | |

TABLE I-continued

| Item | Method | Dimension | Value | Dimension | Value |
|---|---|---|---|---|---|
| Yield strength $\sigma_S$ | DIN 53 455 | kp/cm$^2$ | 470–520 | N/mm$^2$ | 46–51 |
| Tension of yield strength $\epsilon_S$ | DIN 53 455 | % | 17–25 | | |
| Tensile strength $\sigma_R$ | ISO R 527 | kp/cm$^2$ | 500–630 | N/mm$^2$ | 49–62 |
| Break tension | ISO R 527 | % | 200–350 | | |
| Modul of elasticity E | DIN 53 457 Ab.2.3 | kp/cm$^2$ | 19000–22000 | N/mm$^2$ | 1864–2158 |
| Critical bending stress $\sigma_B$ | ISO R 178 | kp/cm$^2$ | 750–1000 | N/mm$^2$ | 74–98 |
| Notch impact strength $a_k$ | DIN 53 453 | kpcm/cm$^2$ | 55–65 | kJ/m$^2$ | 55–65 |
| Ball pressure hardness 10" | DIN 53 456 step C | kp/cm$^2$ | 1000–1050 | N/mm$^2$ | 98–103 |
| Abrasive resistance | Taber-Abrazer | mm$^3$/rpm | 158–129 | | |
| Time yield stress $\sigma/1000$ (23° C./95%) | DIN 53 444 | kp/cm$^2$ | 50–60 | N/mm$^2$ | 4.9–5.9 |
| Modul of creeping $E_c/1000$, $\sigma$20,0 | DIN 53 444 | kp/cm$^2$ | 13000–14000 | N/mm$^2$ | 1275–1373 |

It is essential that these physical characteristics are not only obtained at the beginning of the casting operation, but also at the end of the casting operation and upon several discontinuations of the casting operation. This is an essential advantage as compared to the process according to U.S. Pat. No. 3,793,255. According to this U.S. patent, the entrained and developing gas is carried along by the polymerizing molding mass, the crystallinity is reduced and after a longer casting interval the strength values will be deteriorated considerably and partially to an extent that renders an insufficient product. As compared thereto, according to the invention no bubbles are obtained, but a homogeneous product free of shrink holes and with excellent qualities is obtained from the beginning to the end of the casting operation.

The following examples will explain the invention in more detail.

EXAMPLE 1

The two vessels 1 and 1a first were flushed with nitrogen and thereafter 20 kg each of pure lauric-lactam were fed into each vessel and melted therein under agitation. After the melting vessel 1 has reached a constant temperature of 168.5° C. an amount of 0.32 mole-% of sodium amide, based on lactam, was added as catalyst from bomb 10 under maintenance of the temperature and at this temperature the contents of the vessel were agitated for 20 to 30 minutes. Great attention was given to the circumstance, that the temperature did not fall by more than 1° C. below the aforementioned value.

With a delay of 10 minutes as from the addition of the catalyst to vessel 1 from the bomb 10a a quantity of 0.12 mole-% of phenylisocyanate, based on the lactam, was added as activator to the melt in vessel 1a maintained constantly at a temperature of 165° C. and agitated at a temperature maintained constantly at 165° C.

Then the seals to the two gear pumps and the inlets to the mixing zone of the casting head were opened and the agitation in the vessel was discontinued, so that streams of practically identical viscosity were pumped through the slightly inclined conveyor tubes 16 into the mixing zone, that they maintained at a temperature of 172° C.±1° C., with, however, the conveyor tubes only having been filled to one half, and the gases developing during mixing and initiation of the reaction and the gases, which are any carried entrained along, having been returned through this area via the gear pumpps to the melting vessels. A possibly developing over pressure was discharged via the two-way valve communicating with the filling tube. The combined melts, which only contained very little gas were discharged from the casting nozzle or mouth piece due to the gravity and were cast into molds with normal temperature. The total molding time was about 50 minutes. Samples were taken from the molded articles obtained at the beginning, from the molded articles obtained after 30 minutes and from the molded articles obtained after 50 minutes and these samples were analyzed, with no fundamental differences having been found between the physical qualities of these molded articles apart from scatter defects within the range of 2%. None of the samples displayed any bubble formations, all samples were free of shrink holes and extremely homogeneous.

For reasons of comparison the afore-described test was repeated, yet the apparatus described in U.S. Pat. No. 3,793,255 with the syphon-like conveyor-means leading to the molding nozzle or mouth piece was used. Furthermore, the temperature in both vessels was maintained identical, i.e. at a mean value of 167° C. The addition of the catalyst and the addition of the activator was effected simultaneously and in the above-identified quantities and a recycling of the gases from the mixing head was impossible due to the siphon-like design.

While the first samples obtained in this comparative test had qualities readily comparable to the aforementioned ones, already after 20 minutes a considerable formation of bubbles, formation of shrink holes and inhomogenity of the samples obtained were encountered, while the samples taken at one end of the casting process, had such low strength parameters due to the low crystallinity, that they were practically useless. It was further found, that in the vessel there was a considerable residue of the higher viscous catalyst containing melt.

EXAMPLE 2

The above test, according to the invention of Example 1, was repeated completely identically, yet, around the casting head in addition flat heat shields were arranged, which were heated to 200° C. during casting, yet had no contact with the molding mass.

By this test practically identical products as in Example 1 were obtained, which, however, had an even more appealing appearance.

EXAMPLE 3

The test according to the invention of Example 1 was identically repeated. Yet, in this case an amount of 0.38 mole-% of anhydrous ethanol was added as catalyst, while the addition of phenylisocyanate as activator to the other melting vessel was delayed by 14 minutes as compared to the addition of the catalyst.

In this test, too, molded articles having the same outstanding qualities as those according to Example 1, were obtained.

Due to these excellent qualities the new polylactam molded articles may be used for numerous application fields and are, particularly suitable to replace molded metal articles. They even sound metallic.

What is claimed is:

1. In a process for producing a molded article of a polylauric lactam by activated anionic polymerization of at least one corresponding monomeric lactam wherein a catalyst and an activator are separately added to a first lactam melt and second lactam melt, while both melts are protected by an inert gas, and which melts are thereafter fed to a mixing zone by separate conveyor tube systems being at substantially the same temperature as the melts, and from the mixing zone into a mold, the improvement which comprises:
   (a) adding to the first lactam melt contained in a first vessel at lest one polymerization catalyst for the lactam with agitation and maintaining the mixture of the lactam melt and added catalyst under agitation at a first temperature in the range from about 167.5° C. and about 169.5° C., and at a temperature deviation tolerance of about ±1° C. for said first temperature;
   (b) adding, following the addition of the catalyst to the first lactam melt, at least one activator for the polymerization of the lactam to the second lactam melt under agitation and maintaining the mixture of the second lactam melt and activatoor stirred at a second temperature which is lower than the temperature of the first melt and within a temperature range of from about 164° C., and about 166° C., and at a temperature deviation tolerance of about ±1° C. for said second temperature;
   (c) pumping the first and second melts at about the melt temperatures by respective first and second gear pumps to a mixing zone through respective first and second essentially straight conveyor tube systems having an angle of incline to the horizontal plane of a maximum of about 10°, each conveyor tube having a volume at least one-third greater than the volume conveying capacity of the gear pump to which said tube is coupled;
   (d) combining and mixing the melts in a mixing zone maintained between about 170 and about 175° C. to initiate a polymerization reaction;
   (e) injecting the melt from the mixing zone into a mold for the molded article to form the article with attendant release of gas; and
   (f) returning at least part of the released gas to at least one of the mixing vessels by the conveyor tube systems.

2. The process of claim 1, in which the residence time in the first and second vessels is approximately one hour and the delay in time after catalyst addition to addition of the activator is about 5 to 15 minutes.

3. The process of claim 1 in which the stirring time prior to the injection molding or casting is 20 to 30 minutes after the addition of activator or catalyst.

4. The process of claim 1 in which the melt is guided by the conveyor tube systems inclined at an angle of about 5° with respect to the horizontal plane.

5. The process of claim 1 in which molding is effected while the molds are protected by heat shields heated to about 190° to 220° C.

6. The process of claim 1 in which the melt containing the catalyst is maintained at a temperature of 168.5° C., the melt containing the activator is maintained at a temperature of 165° C., the conveyor tubes have an angle of inclination of about 5° to the horizontal plane and the mixing zone has a temperature of about 172° C., each of said temperatures being within a temperature tolerance of ±1° C.

* * * * *

UNITED STATES PATENT AND TRADEMARK OFFICE
CERTIFICATE OF CORRECTION

PATENT NO. : 4,233,433

DATED : November 11, 1980

INVENTOR(S) : Werner Hartmann

It is certified that error appears in the above-identified patent and that said Letters Patent are hereby corrected as shown below:

In the Abstract, third line from bottom, "themixing" should read -- the mixing --. Column 1, line 33, "3,793,,255" should read -- 3,793,255 --. Column 4, line 8, "representative" should read -- representation --; line 41, "this" should read -- the --; line 58, "group" should read -- pump --. Column 7, line 38, "has" should read -- had --; line 63, "pumpps" should read -- pumps --. Column 9, line 20, "lest" should read -- least --; line 31, "activatoor" should read -- activator --.

Signed and Sealed this

Twenty-fifth Day of January 1983

[SEAL]

Attest:

Attesting Officer

GERALD J. MOSSINGHOFF

Commissioner of Patents and Trademarks